(12) United States Patent
Chen et al.

(10) Patent No.: US 9,060,645 B2
(45) Date of Patent: Jun. 23, 2015

(54) BEVERAGE BREWING DEVICE AND METHOD

(75) Inventors: Vincent Chen, Westminister, CA (US);
Curt Morgan, Huntington Beach, CA (US)

(73) Assignee: Uniterra, Inc., Huntington Beach, CA (US)

( * ) Notice: Subject to any disclaimer, the term of this patent is extended or adjusted under 35 U.S.C. 154(b) by 913 days.

(21) Appl. No.: 13/006,834

(22) Filed: Jan. 14, 2011

(65) Prior Publication Data

US 2011/0185912 A1 Aug. 4, 2011

Related U.S. Application Data

(60) Provisional application No. 61/300,624, filed on Feb. 2, 2010.

(51) Int. Cl.
*A47J 31/38* (2006.01)

(52) U.S. Cl.
CPC ........................................ *A47J 31/38* (2013.01)

(58) Field of Classification Search
USPC ...................... 99/302 P, 302 R, 297
IPC ............... A47J 31/38,31/40, 31/0673, 31/3633, A47J 31/3638, 31/369; G11B 20/1259, 20/00086, 20/00753, 20/00797, G11B 20/0084, 27/329, 7/0037, 7/0065, 7/00736, G11B 7/083, 7/1378, 7/24044
See application file for complete search history.

(56) References Cited

U.S. PATENT DOCUMENTS

| | | | | |
|---|---|---|---|---|
| 2,529,395 | A * | 11/1950 | Hummel | 99/302 P |
| 2,755,733 | A * | 7/1956 | Arosio et al. | 99/290 |
| 2,854,917 | A * | 10/1958 | Lafitte | 99/283 |
| 2,898,844 | A | 8/1959 | Gaggia | |
| 3,077,156 | A | 2/1963 | Egi et al. | |
| 3,137,228 | A | 6/1964 | Elow | |
| 3,429,253 | A * | 2/1969 | Pearl et al. | 99/283 |
| 3,918,355 | A * | 11/1975 | Weber | 99/283 |
| 4,103,602 | A | 8/1978 | Oggioni et al. | |
| 4,271,752 | A * | 6/1981 | Valente et al. | 99/289 R |
| 4,365,544 | A * | 12/1982 | Howitt | 99/297 |
| 4,421,014 | A * | 12/1983 | Vicker | 99/289 P |
| 4,506,596 | A * | 3/1985 | Shigenobu et al. | 99/289 T |

(Continued)

FOREIGN PATENT DOCUMENTS

| | | | |
|---|---|---|---|
| AT | EP0231156 | | 8/1987 |
| GB | 728476 | * | 4/1955 |

(Continued)

OTHER PUBLICATIONS

Achille Gaggia, Gaggia Espresso Machines, 1947, http://gaggia.125west.com/.

*Primary Examiner* — Dana Ross
*Assistant Examiner* — Frederick Calvetti
(74) *Attorney, Agent, or Firm* — Hankin Patent Law APC; Marc E. Hankin; Kevin Schraven

(57) ABSTRACT

This invention is a manually operated beverage brewer that is powered by a user articulating or turning a lever a multiple of times. The lever forces a small piston into a cylinder, which in turn pressurizing a hot liquid poured into the machine. The pressurized liquid flows through a pack of coffee grounds and out of the machine after the user has generated a minimum pressure to overcome an under-pressure valve. The user continues to articulate or turn the lever until the desired amount of coffee exits the machine.

18 Claims, 5 Drawing Sheets

(56) References Cited

U.S. PATENT DOCUMENTS

| | | | |
|---|---|---|---|
| 4,763,566 A * | 8/1988 | Paoletti | 99/302 P |
| 4,833,979 A * | 5/1989 | Garulli et al. | 99/287 |
| 4,936,199 A | 6/1990 | Ruggin et al. | |
| 4,941,399 A * | 7/1990 | Zucchetti | 99/289 P |
| 5,337,652 A | 8/1994 | Fischer et al. | |
| 5,471,910 A * | 12/1995 | Sager | 99/289 R |
| 5,622,099 A * | 4/1997 | Frei | 99/287 |
| 5,913,963 A * | 6/1999 | King | 99/302 P |
| 6,101,923 A * | 8/2000 | Karg et al. | 99/289 D |
| 6,561,080 B1 | 5/2003 | Feeney | |
| 6,666,130 B2 * | 12/2003 | Taylor et al. | 99/305 |
| 6,711,988 B1 * | 3/2004 | Eugster | 99/299 |
| 7,017,474 B2 * | 3/2006 | Comte | 99/302 P |
| 7,066,079 B2 * | 6/2006 | Sager | 99/280 |
| 7,517,440 B2 * | 4/2009 | Anex et al. | 204/450 |
| 7,524,304 B2 * | 4/2009 | Genosar | 604/135 |
| 7,849,784 B2 * | 12/2010 | Adler | 99/297 |
| 8,152,477 B2 * | 4/2012 | Anex et al. | 417/48 |
| 2005/0172818 A1 * | 8/2005 | Hunt et al. | 99/279 |
| 2007/0227363 A1 * | 10/2007 | Verna | 99/279 |
| 2008/0264266 A1 * | 10/2008 | Carbonini et al. | 99/289 R |
| 2012/0017767 A1 * | 1/2012 | Samso Besora | 99/302 R |

FOREIGN PATENT DOCUMENTS

| | | | |
|---|---|---|---|
| GB | 765801 | * | 1/1957 |
| WO | WO2007016977 | * | 2/2007 |

* cited by examiner

BEVERAGE BREWING DEVICE AND METHOD

CROSS-REFERENCE TO RELATED APPLICATIONS

Priority is claimed to U.S. Provisional Patent Application Ser. No. 61/300,624 filed on Feb. 2, 2010, titled "Hydraulically Advantaged Manually Operated Coffee Brewer" by inventors Vincent Chen and Curt Morgan, the entire contents of which are expressly incorporated herein by this reference.

FIELD OF THE INVENTION

This invention relates to a coffee beverage brewer. More specifically, the invention relates to a coffee brewer or espresso device that is powered by a manually-operated, hydraulic piston pump.

BACKGROUND

Coffee beverages are one of the most popular and universal drinks in the world. One popular type of a coffee beverage, espresso, is brewed by forcing hot water, under pressure, through compacted coffee grounds over a short period of time. Generally, this is accomplished with an apparatus involving water tanks and plumbing, water heating elements, electric motors, pumps, valves, and filters. As a result, standard devices are usually large, expensive, and complicated, and require a skilled operator. Because of these factors, brewing a truly great cup of espresso is inconvenient and restricted to appropriate venues.

The first type of espresso machines were steam-driven machines and they were invented at the turn of the 20th Century by Pavone. A steam-driven espresso machine works by forcing water through the coffee by using steam or steam pressure. This design is still in use in lower-cost consumer kitchen appliance espresso makers. The stem-driven espresso machine is low cost because it has few moving parts. However, due to the inherent high temperature and low pressure of these devices the beverage produced is of low quality.

In the mid 20th Century Achille Gaggia, developed the first piston driven espresso machine. Generally, the piston driven espresso machine uses a lever, pulled by the operator, to pressurize hot water and send it through the coffee grinds. The act of producing a shot of espresso is colloquially referred to as pulling a shot, because of the lever-style espresso machines required pulling a long handle to produce a shot of espresso. There are two types of lever machines: direct lever and spring loaded. With the direct lever, the operator directly pushes the piston with the force of the lever. In the spring piston design, the operator works to tension a spring, which drives the piston, which then delivers the pressure needed to produce the espresso. The lever espresso machine allowed the user to finally apply the optimal pressure of 8 to 10 bars to the system.

In the 1960's espresso machines with automatic pumps were developed. The pump is typically an electric motor driven pump. This electric pump driven espresso machine remains the most popular type of espresso machine.

More recently, the air pressure espresso machine was invented. The air pressure espresso machine uses compressed air to force the hot water through the coffee grounds. The hot water is typically added from a kettle or a thermo flask. The compressed air comes from either a hand-pump, Nitrous (NO2) or Carbon Dioxide (CO2) cartridge, or an electric compressor. One of the advantages of the air pressure driven machines is that they are often handheld and portable. Unfortunately, a significant drawback to the air pressure machine is that the pressure profile is inconsistent throughout the brewing cycle, being higher at the beginning and lower at the end. A further drawback of the gas cylinder powered NO2/CO2 machines is the requirement to replenish gas cartridges because one cartridge only makes a few shots of espresso.

The present invention is generally related to a piston driven espresso machine. One example of a piston driven espresso machine is disclosed by U.S. Pat. No. 2,898,844, issued to Gaggia. The Gaggia patent discloses an automatic version of the hand lever piston driven espresso machine that Gaggia is also credited with inventing. The Gaggia espresso machines use a single large piston that is actuated when the user pulls a lever (or presses a button, in the case of the automatic machine). The single Gaggia piston pressurizes the water and forces it through the compacted coffee grounds. Although the Gaggia hand lever espresso machine has been around since the 1930's, very little, besides making it automatic, has been done to improve the machine. Indeed, the Gaggia hand lever espresso machine is still commercially available. Importantly, not every person that wants a hand lever pressed cup of espresso has the strength or body mass to provide the necessary force on the lever to bring the hot water to 8-10 bars. Furthermore, need for mechanical advantage requires a large lever securely anchored and thus results in a physically large machine. Merely finding room for the machine on a stable platform is a challenge. Additionally, the automatic piston espresso machines require a source of alternating current electricity and are therefore, not portable. Thus, what is needed is an improved portable manual espresso machine that allows even a weak user to brew a cup of espresso at the optimal 8-10 bars of pressure.

SUMMARY OF THE INVENTION

The disclosed invention is a device and method for making espresso and brewing coffee that combines high pressure, hot water, compacted coffee grounds, and a filter, into a convenient, portable, low-cost, easy to use, and manual device. The device uses one or more smaller pistons actuating multiple times to build up the optimal pressure by hydraulic advantage without the extreme exertion that is needed by the standard manual lever piston espresso machine. As a result, the espresso brewer is small, highly portable, easy to use and, because the optimal pressure is achieved, makes a great cup of espresso.

One embodiment of the invention is a user powered beverage brewing device comprising: a liquid reservoir; a food chamber; one or more pistons; one or more cylinders; a lever; and a filter. The food chamber may be opened and closed, opened to add food and then closed to create a gas tight seal to enable chamber pressurization. The pistons matingly and slidingly fit within the cylinders. The lever is articulated manually by a user to draw a liquid that is added to said liquid reservoir into the cylinders and wherein the pistons pressurize and pump the liquid out to the food chamber. The incoming liquid builds up pressure within the food chamber. The pressurized liquid passes through the food, usually coffee, contained within said food chamber and exits through the filter. The liquid that passes through the food is infused with the food at high pressure to create an infused liquid, usually a brewed coffee beverage, such as espresso. The liquid is pressurized to a minimum pressure by articulating the lever a plurality of times before the infused liquid exits the user powered beverage brewing device.

Because the pistons are much smaller than the normal espresso maker pistons (ten to forty times smaller), the user continuously articulates the lever to build up pressure to the minimum pressure and the user stops articulating the lever after a desired amount of infused liquid has exited the user powered beverage brewing device. The food chamber and pistons have a cross-sectional area and the ratio of the cross-sectional area of the piston(s) to the cross-sectional area of the food chamber is in a range of 1/5 to 1/100 and preferably is in the range of 1/10 to 1/40.

Preferably, the minimum pressure is between 6 to 9 bars.

The user powered beverage brewing device might also include a flow control device which controls the outflow of infused liquid. The flow control device restricts said infused liquid from exiting the user powered beverage brewing device until the liquid is pressurized to the minimum pressure. In other words, the flow control device prevents the unregulated discharge of beverage when the system does not have enough pressure to brew a great cup of espresso and allows the device to build up the proper pressure.

Typically, the cylinders have a lower swivel joint, which allows the cylinders to arc or flap as the pistons slide in and out of the cylinders. Alternatively, the cylinders may also be fixed and the pistons actuated with an articulating joint to accommodate the necessary arc. Preferably the user powered beverage brewing device also includes a rocker arm. The rocker arm has a lever end and, depending on how many pistons, one or more piston ends or connection points. The lever end of said rocker arm is attached to said lever and the piston ends of said rocker arm are rotatably attached to the pistons. The lever, when articulated, causes the rocker arm to move the pistons up and down inside the cylinders. The device also might include one or more inflow check valves and/or one or more outflow check valves. The inflow check valves allow the liquid to move from the liquid reservoir to the cylinders and prevent the liquid from moving from the cylinders to the liquid reservoir. The outflow check valves allow the liquid to move from the cylinders to the food chamber and prevent the liquid from moving from the food chamber to the cylinders. In other words, the inflow and outflow check valves provide unidirectional flow of the hot water from the water reservoir to the food chamber. The device may also include one or more output tubes. The output tubes connect the cylinders to the food chamber and may house the output valves. The user powered beverage brewing device may also include a beverage out port. The infused liquid exits the user powered beverage brewing device through the beverage out port. The beverage out port may house a flow control device.

Another embodiment of the invention is a user powered beverage brewing device comprising: a liquid reservoir; a food chamber; a plurality of pistons; a plurality of cylinders; a crank lever; a rocker arm; and a filter. Although the device may have any number of pistons and cylinders, the preferred number is two. The plurality of pistons matingly and slidingly fit within the plurality of cylinders. The crank lever is articulated manually by a user to draw a liquid that is added to the liquid reservoir into the cylinders and the pistons pressurize and pump the liquid out to the brewing chamber. The incoming fluid builds up pressure within the brewing chamber. The pressurized liquid passes through a food contained within the food chamber and exits through the filter. The liquid that passes through the food is infused with the food at high pressure to create an infused liquid. The liquid is pressurized to a minimum pressure by articulating the crank lever a plurality of times before the infused liquid may exit the user powered beverage brewing device. The pistons are rotatably attached to the rocker arm. The rocker arm is connected to said crank lever such that when said crank lever is articulated, said rocker arm is turned and wherein said plurality of pistons are moved alternately into and out of said plurality of cylinders. Preferably the user continuously articulates the crank lever to build up pressure to the minimum pressure and the user stops articulating the crank lever after a desired amount of infused liquid has exited through said user powered beverage brewing device. The minimum pressure is preferably in the range of 6 to 9 bars. The device preferably includes a flow control device, which restricts the infused liquid from exiting the user powered beverage brewing device when pressure within the food chamber is below the optimal brewing pressure. The flow control device is preferably adjustable so that the user can select the desired brewing pressure.

In another embodiment of the invention, the rocker arm rotates in an arc such that, when a first piston is pressurizing said liquid in a first cylinder, a second piston is alternately withdrawing from the second cylinder and when said second piston is pressurizing the liquid in the second cylinder, the first piston is alternately withdrawing from the first cylinder, such that one of the two cylinders are constantly pressurizing the liquid when the rocker arm is rotated by the crank lever. Preferably, the rocker arm is substantially disc shaped and rotates in a continuous 360 degree circle and first piston and the second piston are rotatably connected to opposite sides of the disc shaped rocker arm.

In another embodiment, the user powered beverage brewing device includes a plurality of inflow check valves; and a plurality of outflow check valves. The inflow check valves allows the liquid to move from the liquid reservoir to the cylinders and the inflow check valves prevent the liquid from moving from the cylinders to the liquid reservoir. The outflow check valves allows the liquid to move from the cylinders to the food chamber and prevent the liquid from moving from the food chamber to the cylinders. Typically, the cylinders have a lower swivel joint, which allows the cylinders to arc as the pistons slide in and out of the cylinders. The device may also include a plurality of output tubes and a beverage out port. The output tubes connect the cylinders to the food chamber.

Before producing coffee or espresso using the device, the user must prepare the device. First the user opens the food chamber and places (or preferably well packs) coffee grounds, cocoa powder, or other food into the food chamber. Then the food chamber is closed, creating a gas tight seal. Depending on the grind of the coffee and how well the grounds are packed, determines what pressure the liquid must be at before the hot liquid will flow through the grounds. Because users do not always appropriately pack or grind the ground coffee, the pressure needed to overcome the coffee grounds may be too low (2-6 bars) to make a proper cup of espresso. This is why the flow control device in the beverage out port is important. It prevents unrestricted flow until proper food chamber pressure is achieved. The compacted coffee grounds remain in the food receptacle in a fixed and sealed position. Then, hot water is poured into the liquid reservoir.

The user is now ready to use the machine to make a great cup of espresso. The user grabs the lever or crank lever and continuously articulates it back and forth or rotates it in a circle, depending on the specific construction. The lever or crank lever is connected, directly or indirectly, to a piston. The piston is preferably much smaller than the normal espresso piston, and has a much smaller cross sectional area than the cross sectional area of the food chamber (preferably the ratio is in the range of 1 to 10 (1/10) to 1 to 40 (1/40)), which creates a hydraulic mechanical advantage and makes it much easier for the user to articulate or turn the lever. The continuous motion of the crank allows the user to pressurize the hot liquid and build up the pressure necessary to send the fluid through the coffee. The lever may be a handle, crank, wheel, or any similar type of device to move the one or more pistons. Additionally, the lever may be connected to the piston through an associated arm or other torque increasing device.

Preferably, the operator makes a series of small, easy, repetitive reciprocating strokes on the lever to create a buildup of pressure. The piston cross sectional area and volume displacement is such that each stroke of the lever will only produce a fraction of the final beverage volume, which may be between one-twentieth and one-sixtieth of the total output. The small cross sectional area of the pump pistons results in a hydraulic mechanical advantage with far less exertion force required by the user. With less manual force acting on the piston, the user may become less fatigued, but can still create a substantial amount of hydraulic pressure. Importantly, the small pump piston and cylinder size makes it possible to reduce the size of an espresso machine to a hand held footprint.

At a comfortable pumping or articulating speed, the piston can produce an output volume that will match the operator's effort, which translates to about 60 cubic centimeters (CCs) for a double shot of espresso, if so desired. Furthermore, since the operator motion is back and forth or in a circle, both concentric and eccentric muscle activity is involved. By spreading the work over more muscle groups in this reciprocating fashion, the operator experiences less fatigue and lower perceived exertion.

Another embodiment of the invention is a method of brewing a beverage using the device. The method preferably includes the steps of: (1) providing the present invention; (2) filling a liquid reservoir with hot water; opening the food chamber; (3) packing coffee grounds in the food chamber; (4) closing said chamber; (5) continuously articulating a lever or crank lever to create pressure with a piston and cylinder assembly immersed in the hot water reservoir; (6) capturing the pressurized hot water; and (7) directing the pressurized hot water into the food chamber and through the packed coffee grounds to create espresso. The present invention is not limited to water and coffee. Any liquid or food may be used, including, but not limited to, prepackaged beverage pods.

It is an object of the invention to provide a manual, portable, easy to use, and inexpensive beverage brewer that allows even a novice user of any strength to make a perfect cup of espresso.

Other features and advantages are inherent in the beverage brewer as claimed and disclosed will become apparent to those skilled in the art from the following detailed description and its accompanying drawings.

DETAILED DESCRIPTION OF THE DRAWINGS

In the following detailed description of one embodiment, reference is made to the accompanying drawings that form a part hereof, and in which is shown, by way of illustration, a specific embodiment in which the invention may be practiced. It is to be understood that other embodiments may be utilized and structural changes may be made without departing from the scope of the present invention.

In the following detailed description of the various embodiments of the invention, numerous specific details are set forth in order to provide a thorough understanding of various embodiments of the invention. However, one or more embodiments of the invention may be practiced without these specific details. In other instances, well-known methods, procedures, and/or components have not been described in detail so as not to unnecessarily obscure aspects of embodiments of the invention.

The brewing device is a compact coffee brewer powered by a manually-actuated, hydraulic pump system. In order to make high-quality espresso, ground coffee beans must be compacted and held in place by a coffee chamber or receptacle. The user then turns a pump, lever, crank, or similar device to move one or more pistons into and out of one or more associated cylinders. The piston/cylinder combination creates hydraulic pressure. The hydraulic pressure forces the hot water into the coffee receptacle. The pressurized water passes through the coffee grounds to create brewed coffee.

Figure 1:
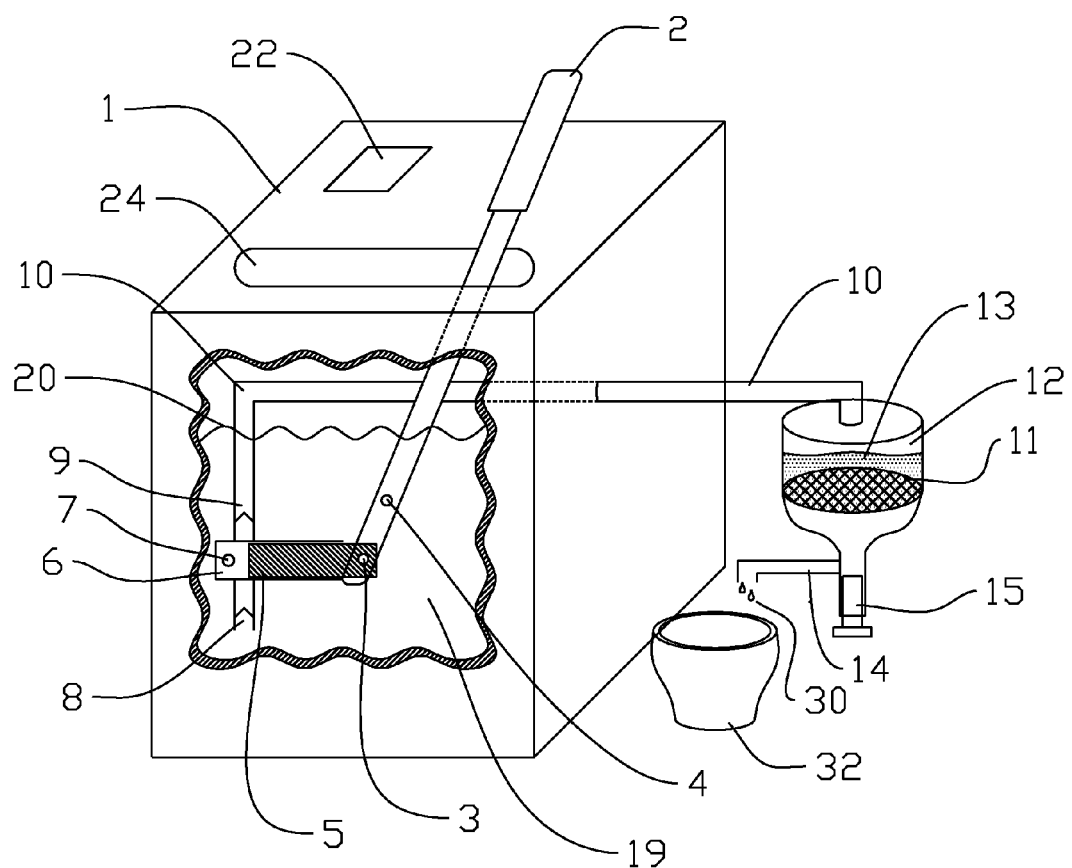
FIG. 1 is an illustration of a perspective cutaway view of one embodiment of the beverage brewer.

FIG. 1 is an illustration of a perspective cutaway view of one embodiment of the beverage brewer. As shown in FIG. 1, the beverage brewer 1 preferably includes lever 2, rotatable lever/piston joint 3, fulcrum 4, piston 5, cylinder 6, swivel joint 7, inflow check valve 8, outflow check valve 9, output tube 10, filter 11, food chamber 12, food 13, output spout 14, flow control device 15, liquid reservoir 19, liquid opening 22, and lever slot 24. The liquid reservoir 19 preferably contains the piston/cylinder assembly so that a liquid 20 that is poured into liquid opening 22 surrounds the piston/cylinder assembly. As shown in FIG. 1, the lever 2 is articulated on fulcrum 4. In this embodiment, the lever 2 is connected directly to the piston 5 via joint 3. The piston 5 is matingly and slidingly within a matching cylinder 6. The cylinder 6 draws liquid 20 in through inflow check valve 8. FIG. 1 specifically shows that piston 5 is pressurizing liquid 20 because the lever has been articulated on fulcrum 4 to force piston 5 into cylinder 6. The liquid 20 is pressurized and pumped out of the cylinder 6 through outflow check valve 9. The pressurized liquid travels in output tube 10 to food chamber 12. When the pressurized liquid builds up enough pressure, it enters food 13, passes through filter 11 and exits through output port 14 as an infused liquid 30. In the event that the packed food 13 is not packed correctly, and thus does not provide adequate flow resistance to reach the optimal infusing pressure, the device 1 preferably includes a flow control device 15, which will restrict the pressurized liquid from exiting the food chamber 12 until a minimum or desired pressure is reached. Once the minimum pressure is reached, the flow control device 15 regulates flow to maintain optimal brewing pressure and discharge infused liquid through output spout 14. The flow control device 15 is preferably adjustable. For an optimal cup of espresso the flow control device 15 is set to maintain food chamber pressure at 8-10 bars. However, the flow control device 15 may be set at any desired food chamber pressure level from 1 to 15 bars.

To prepare the machine to make an infused liquid 30, which is preferably captured in cup 32, the user must first fill the liquid reservoir 19 with a liquid 20 (preferably hot water, although any liquid may be used). The user must also fill, and if making espresso, pack, the food chamber 12 with food 13 (preferably coffee, although any food may be used).

The piston 5 is preferably a cylindrical solid rod. If perpendicularly bisected, the piston 5 has a cross-sectional area. The food chamber 12, preferably, is also cylindrical in shape, but hollow, so that when the coffee or food 13 is packed into the food chamber 12 it takes on a cylindrical shape. The food chamber 12 and packed coffee 13, if perpendicularly bisected, has a cross-sectional area. In prior piston driven espresso machines, in order to generate the force necessary in a single pull to make a shot of espresso, the cross-sectional area of the piston was essentially the same as or even larger than the cross-sectional area of the food chamber. In this invention, the cross-sectional area of the piston is much smaller than the cross-sectional area of the food chamber. Because the food chamber is preferably the same size as a standard prior art espresso maker, the pistons of the present invention necessarily have a much smaller cross-sectional surface area than standard espresso machine pistons.

Because piston 5 is preferably much smaller than the standard espresso piston and has a much smaller cross-sectional area than the food chamber 12, the pressure must be built up by articulating the lever 2 many times back and forth. The lever slot 24 not only allows the lever 2 to move back and forth when articulated, but it also allows the lever 2 to be accessed outside of the machine. Because piston 5 is small, relative to the food chamber, the resultant hydraulic mechanical advantage allows even a very weak user to articulate the lever 2 to build up the necessary pressure to make a great cup of espresso. Typically, the user will articulate the lever 2 for twenty (20) to sixty (60) seconds depending on how much coffee is packed in food chamber 12, and depending on how much espresso the user desires.

Figure 2:
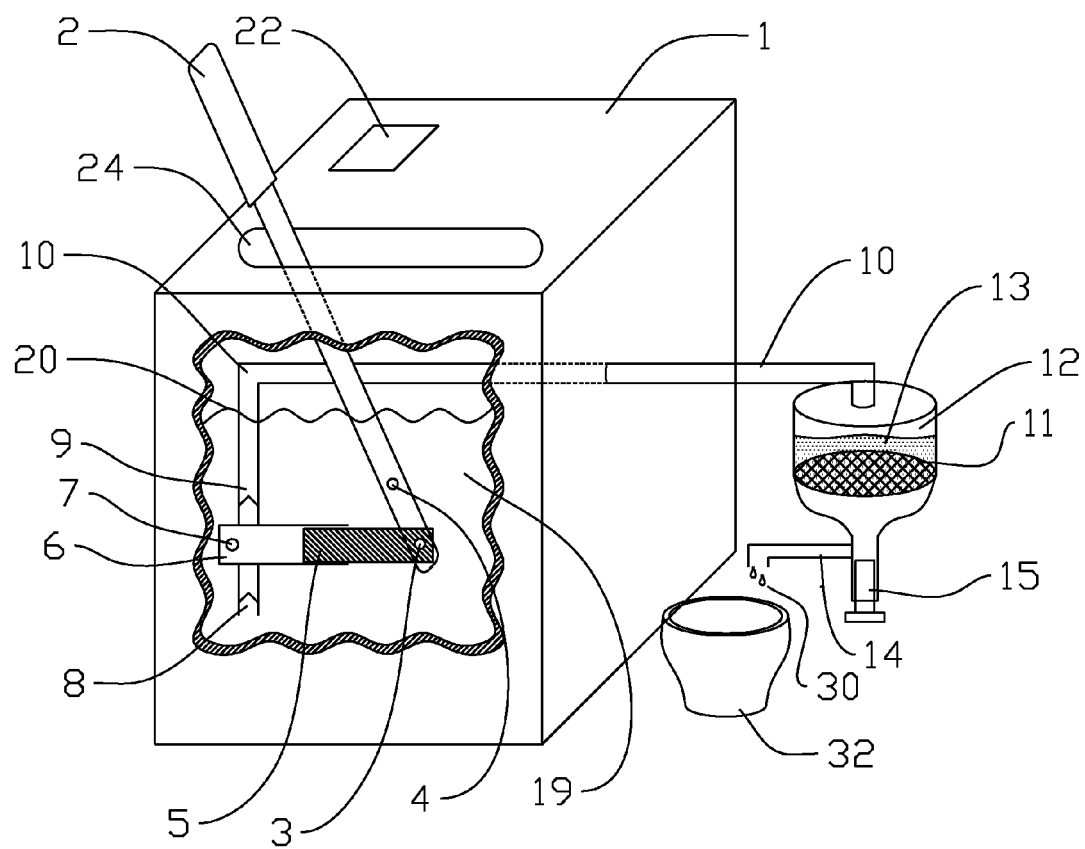
FIG. 2 is an illustration of a perspective cutaway view of one embodiment of the beverage brewer and shows the piston withdrawing from the cylinder.

FIG. 2 is an illustration of a perspective cutaway view of one embodiment of the beverage brewer and shows the piston withdrawing from the cylinder. As shown in FIG. 2, the beverage brewer 1 preferably includes lever 2, rotatable lever/piston joint 3, fulcrum 4, piston 5, cylinder 6, swivel joint 7, inflow check valve 8, outflow check valve 9, output tube 10, filter 11, food chamber 12, food 13, output spout 14, flow control device 15, liquid reservoir 19, liquid opening 22, and lever slot 24. FIG. 2 specifically shows that piston 5 is withdrawing from cylinder 6 and, thus, sucking liquid 20 into cylinder 6. Swivel joint 7 connects cylinder 6 to device 1 and also allows cylinder 6 to flap or arc matingly with piston 5 as piston 5 is moved back and forth in an arcing path around fulcrum 4. Although FIGS. 1 and 2 show the lever 2, piston 5, and cylinder 6, with a specific assembly, it should be understood that any piston/cylinder assembly that allows the articulation of a lever to pressurize liquid using a piston may be used. Additionally, any number of pistons and cylinders may be used.

Figure 3:
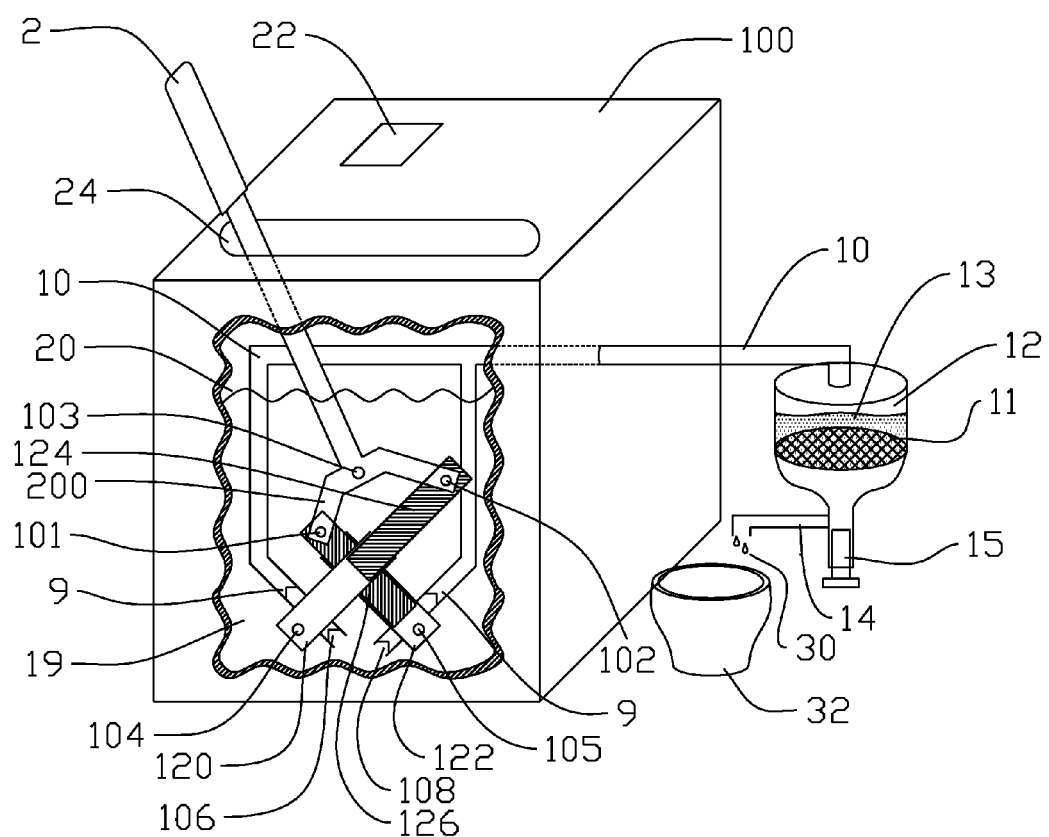
FIG. 3 is an illustration of a perspective cutaway view of one embodiment of the beverage brewer with two pistons.

FIG. 3 is an illustration of a perspective cutaway view of one embodiment of the beverage brewer with two pistons. As shown in FIG. 3, the beverage brewer 100 preferably includes lever 2, rocker arm/lever joint 103, rocker arm/piston joints 101 and 102, rocker arm 200, pistons 124 and 126, cylinders 122 and 120, swivel joints 104 and 105, inflow check valves 106 and 108, outflow check valves 9, output tube 10, filter 11, food chamber 12, food 13, output spout 14, flow control device 15, liquid reservoir 19, liquid opening 22, and lever slot 24. The liquid reservoir 19 preferably contains the piston/cylinder assembly so that a liquid 20 that is poured into liquid opening 22 surrounds the piston/cylinder assembly. As shown in FIG. 3, the lever 2 is articulated on rocker arm/lever joint 103, which also serves as the fulcrum in this embodiment. The lever 2 is connected to rocker arm 200, which in turn is connected to pistons 124 and 126. When the lever 2 is articulated, the rocker arm 200 moves with the lever 2, and causes pistons 124 and 126 to alternately move into and out of the cylinders 120 and 122. FIG. 3 shows that piston 126 is moving into cylinder 122 and piston 124 is moving out of cylinder 120. When the lever is articulated back to the right, piston 126 will move out of cylinder 122 and piston 124 will move into cylinder 120. In this manner, the articulation of the lever 2 will cause the liquid 20 to be continuously pressurized by one of the two pistons 124 and 126.

FIG. 3 also shows how the two cylinders 120 and 122 are set in a crisscross manner to save space. The cylinders 120 and 122 are attached to device 100 by swivel joints 104 and 105 so they can matingly move with pistons 124 and 126 as the pistons 124 and 126 travel back and forth in an arced path around fulcrum rocker arm/lever joint 103. Having two pistons and cylinders working alternately allows the user to significantly cut down the time needed to brew the espresso and provides a more consistent pressure profile because the liquid 20 flows continuously through the system. Once the pressurized fluid passes into output tube 10, the embodiment in FIG. 3 works essentially the same as the embodiment shown in FIGS. 1 and 2.

Figure 4:
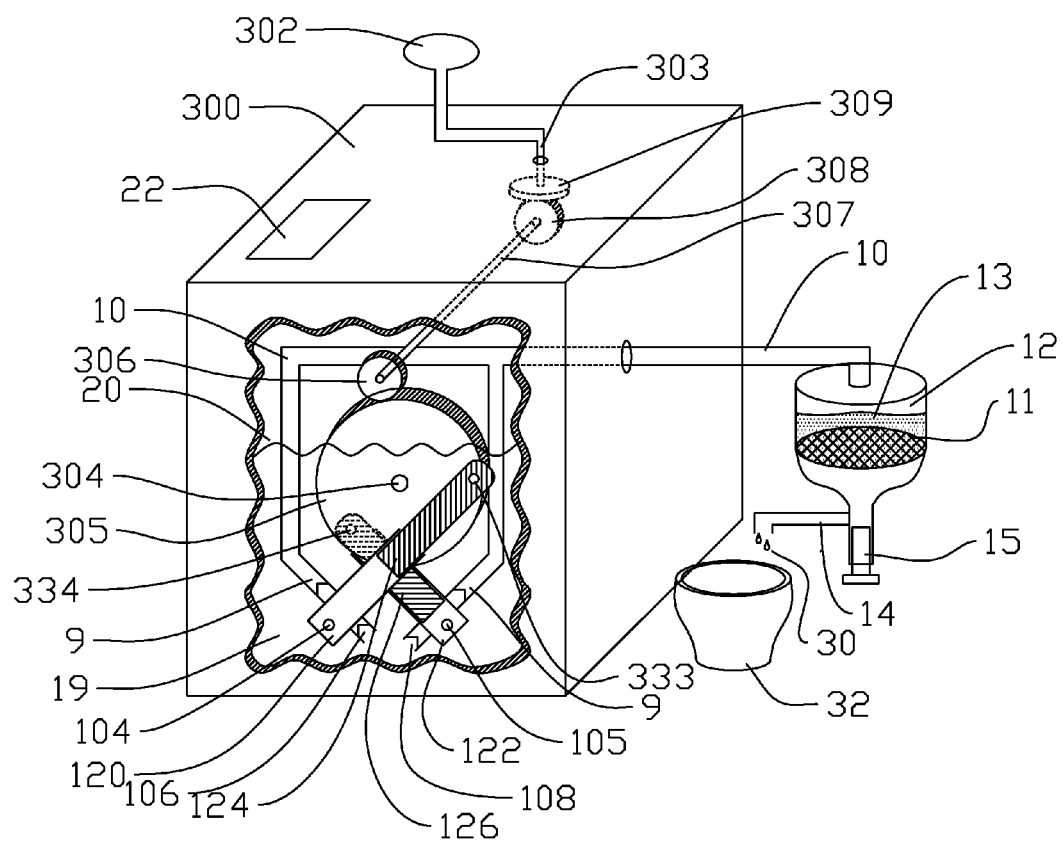
FIG. 4 is an illustration of a perspective cutaway view of one embodiment of the beverage brewer with a crank lever, circular rocker arm, and two pistons.

FIG. 4 is an illustration of a perspective cutaway view of one embodiment of the beverage brewer with a crank lever, rocker arm, and two pistons. As shown in FIG. 4, the beverage brewer 300 preferably includes crank lever 302, crank lever shaft 303, top rotor gear 309, rotor gears 306 and 308, rotor shaft 307, rocker arm joint 304, rocker arm 305, rocker arm/piston joints 334 and 333, pistons 124 and 126, cylinders 122 and 120, swivel joints 104 and 105, inflow check valves 106 and 108, outflow check valves 9, output tube 10, filter 11, food chamber 12, food 13, output spout 14, flow control device 15, liquid reservoir 19, and liquid opening 22. The liquid reservoir 19 preferably contains the piston/cylinder assembly so that a liquid 20 that is poured into liquid opening 22 surrounds the piston/cylinder/rocker arm assembly. As shown in FIG. 4, the crank lever 302 is articulated by turning it in a reciprocating arc or in a complete circle. When crank lever 302 is turned, crank lever shaft 303, top rotor gear 309, rotor gears 306 and 308, rotor shaft 307 are also turned. Rotor gear 306 then causes the rocker arm 305 to turn as well. Rocker arm 305, as shown in FIG. 4 is preferably a substantially circular disc. The pistons 124 and 126 are preferably rotatably connected to the rocker arm 305 at rocker arm/piston joints 334 and 333. FIG. 4 shows how rocker arm/piston joints 334 and 333 are preferably on opposite sides and ends of the rocker arm 305. In this manner, when a user turns the crank lever 302 in a reciprocating or continuously circular motion, the pistons 124 and 126 alternately move into and out of cylinders 120 and 122 and the liquid 20 will be continuously pressurized by one of the two pistons 124 and 126. Additionally, if a continuously circular motion is used, the user will be able to smoothly and easily manually operate the device to brew a great cup of espresso.

It should be understood that any number of pistons may be used and any configuration of the shafts, pistons, cylinders, arms, arms, and cranks may be used without deviating from the scope of the invention.

Once the fluid 20 passes into output tube 10, the embodiment shown in FIGS. 3 and 4 work essentially the same as the embodiment shown in FIGS. 1 and 2.

In addition to coffee beverages, the method and device of the present invention can be used to make any other type of infused beverage such as tea, chai, or hot coco, in bulk or prepackaged pod format.

Figure 5:
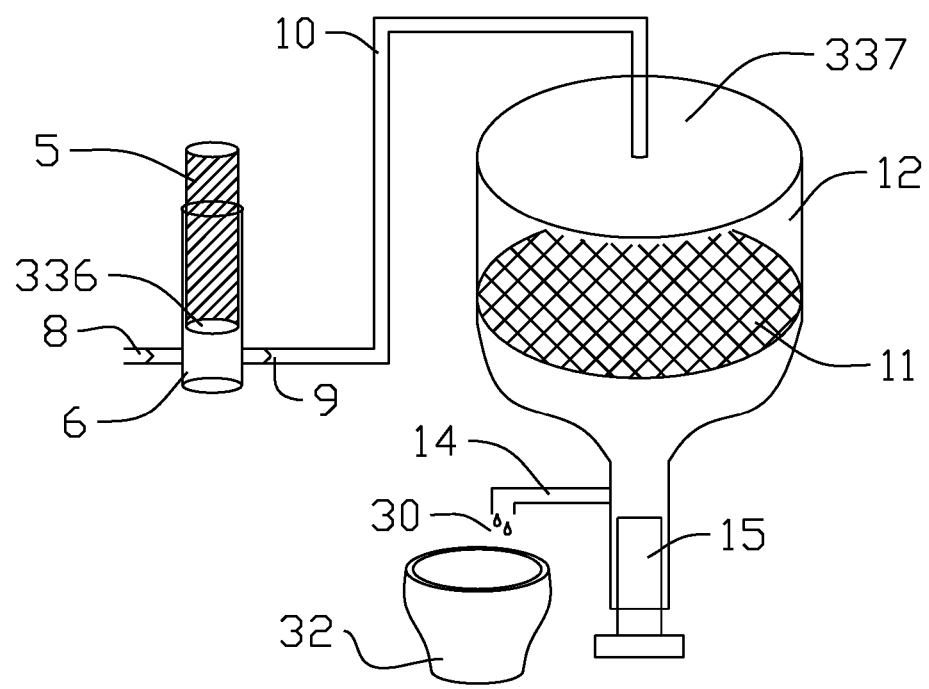
FIG. 5 is a detailed illustration of the piston to food chamber cross-sectional ratio.

FIG. 5 is a detailed illustration of the piston to food chamber cross-sectional ratio. As shown in FIG. 5, the cylinder 6 contains piston 5, which in combination pulls fluid in through inflow check valve 8 and pumps fluid out through outflow check valve 9. The fluid out flows out through output tube 10 and into food chamber 12. The fluid flows through the food chamber 12, through the filter 11, by flow control device 15, and out the out port 14 as an infused beverage 30 which falls into cup 32. FIG. 5 also shows how piston 5 has a cross-sectional area 336 and food chamber has cross-sectional area 337. FIG. 5 shows that the food chamber 12 cross-sectional area 337, as preferred, is proportionally larger than piston 5 cross-sectional area 336. The cross-sectional area ratio of the piston 5 to the food chamber 12, which is preferably about one (1) to forty (40), can be determined by measuring the diameters of the piston 5 and food chamber 12, determining the radius (r), and then calculating the area using the formula: area equals pi times the radius squared or $A=\pi*r^2$. For example, if the diameter of the piston 5 is 2 centimeters (cm), the radius is 1 cm, then the cross-sectional area 336 of the piston 5 is equal to 3.14 times 1 squared (or 1). As such, the cross-sectional area 336 of the piston 5 is 3.14 square centimeters ($cm^2$). If the diameter of the food chamber 12 is 12 cm, the radius is 6 cm, then the cross-sectional area 337 of the food chamber 12 is equal to 3.14 times 6 squared (or 36). As such, the cross-sectional area 337 of the food chamber 12 is 113.04. Therefore, the ratio of the cross-sectional area 336 of the piston 5 to the cross-sectional area 337 of the food chamber 12 is 3.14/113.04 or 1/36, which is within the optimal ratio range of 1/10 to 1/40.

The foregoing description of the preferred embodiment of the invention has been presented for the purposes of illustration and description. While multiple embodiments are disclosed, still other embodiments of the present invention will become apparent to those skilled in the art from the above detailed description, which shows and describes illustrative embodiments of the invention. As will be realized, the invention is capable of modifications in various obvious aspects, all without departing from the spirit and scope of the present invention. Accordingly, the detailed description is to be regarded as illustrative in nature and not restrictive. Also, although not explicitly recited, one or more embodiments of the invention may be practiced in combination or conjunction with one another. Furthermore, the reference or non-reference to a particular embodiment of the invention shall not be interpreted to limit the scope of the invention. It is intended that the scope of the invention not be limited by this detailed description, but by the claims and the equivalents to the claims that are appended hereto.

We claim:

1. A user powered beverage brewing device comprising:
a liquid reservoir;
a food chamber;
two pistons;
two cylinders;
a lever; and
a filter;
wherein said two pistons matingly and slidingly fit within said two cylinders;
wherein said lever is articulated manually by a user such that said two pistons move in an alternating and reciprocating manner, such that a liquid that is added to said liquid reservoir is drawn into said two cylinders, and wherein said liquid is alternately pressurized by said two pistons within said two cylinders in a substantially continuous manner when said lever is articulated;
wherein said pressurized liquid exits said two cylinders and enters said food chamber;
wherein said pressurized liquid passes through a food contained within said food chamber and exits through said filter by articulating said lever repeatedly and continuously a plurality of times;
wherein said pressurized liquid that passes through said food is infused with said food to create an infused liquid;
wherein said food chamber has a food chamber cross-sectional area at a widest point of said food chamber;
wherein each of said two pistons have a cross-sectional area; and
wherein a ratio of said cross-sectional area of each of said two pistons to said cross-sectional area of said food chamber is in range 1/5 to 1/100, such that a hydraulic mechanical advantage is created, which reduces a force necessary by said user to articulate the lever, which makes it easier for said user to repeatedly and continuously articulate said lever until a desired amount of said infused liquid is created.

2. The user powered beverage brewing device of claim 1, wherein said ratio of said cross-sectional area of each of said two pistons to said food chamber cross-sectional area of said food chamber is in a range of 1/10 to 1/40.

3. The user powered beverage brewing device of claim 1, further comprising:
a flow control device;
wherein said flow control device restricts said infused liquid from exiting said user powered beverage brewing device when an internal pressure of said food chamber is below a minimum pressure.

4. The user powered beverage brewing device of claim 3, wherein said minimum pressure is in a range of 6 to 10 bars.

5. The user powered beverage brewing device of claim 3, wherein said two cylinders have a lower swivel joint; and
wherein said lower swivel joint allows said two cylinders to arc as said two pistons slide in and out of said two cylinders.

6. The user powered beverage brewing device of claim 5, further comprising:
a rocker arm;
wherein said rocker arm has a lever end and one or more piston ends;
wherein said lever end of said rocker arm is attached to said lever and said one or more piston ends of said rocker arm are rotatably attached to said two pistons; and
wherein said lever, when articulated, causes said rocker arm to move said two pistons into and out of said two cylinders.

7. A user powered beverage brewing device comprising:
a liquid reservoir;
a food chamber;
two pistons, a first piston and a second piston;
two cylinders, a first cylinder and a second cylinder;
a lever;
a flow control device;
a filter; and
wherein each of said pistons matingly and slidingly fit within each of said cylinders;
wherein said two pistons and two cylinders are substantially contained within said liquid reservoir;
wherein a liquid is added to said liquid reservoir, such that at least a bottom portion of said two cylinders are substantially covered by said liquid;
wherein said lever is articulated manually by a user such that said two pistons move in an alternating and reciprocating manner, such that said liquid that is added to said liquid reservoir is drawn into said two cylinders, and wherein said liquid is alternately pressurized by said two pistons within said two cylinders in a substantially continuous manner when said lever is articulated;
wherein said pistons pressurize and pump said liquid into said food chamber;

wherein said pressurized liquid exits said two cylinders and enters said food chamber;

wherein said pressurized liquid passes through a food contained within said food chamber and exits through said filter by articulating said lever repeatedly and continuously a plurality of times;

wherein said pressurized liquid that passes through said food is infused with said food to create an infused liquid; and wherein said flow control device restricts said infused liquid from exiting said user powered beverage brewing device when an internal pressure of said food chamber is below a minimum pressure.

8. The user powered beverage brewing device of claim 7, wherein said minimum pressure is in a range of 6 to 10 bars.

9. The user powered beverage brewing device of claim 7, wherein said food chamber has a food chamber cross-sectional area at a widest point of said food chamber;

wherein each of said two pistons have a cross-sectional area; and wherein a ratio of said cross-sectional area of each of said two pistons to said food chamber cross-sectional area of said food chamber is in range ⅕ to ¹⁄₁₀₀, such that a hydraulic mechanical advantage is created, which reduces a force necessary by said user to articulate said lever, which allows said user to repeatedly and continuously articulate said lever easily until a desired amount of said infused liquid is created.

10. A user powered beverage brewing device comprising:
a liquid reservoir;
a food chamber;
two pistons;
two cylinders;
a crank lever;
a rocker arm; and
a filter wherein said two pistons matingly and slidingly fit within said two cylinders;

wherein said crank lever is articulated manually in a repeated and continuous manner by a user to draw a liquid that is added to said liquid reservoir into said two cylinders and wherein two pistons alternately pressurize said liquid that is drawn into said two cylinders to create a pressurized liquid in a substantially continuous manner;

wherein said pressurized liquid exits said cylinders and enters said food chamber;

wherein said pressurized liquid passes through a food contained within said food chamber and exits through said filter by articulating said lever repeatedly and continuously a plurality of times;

wherein said pressurized liquid that passes through said food is infused with said food to create an infused liquid;

wherein said two pistons are rotatably attached to said rocker arm;

wherein said rocker arm is connected to said crank lever such that when said crank lever is articulated, said rocker arm is turned and wherein said two pistons are moved alternately into and out of said two cylinders; and wherein said user repeatedly and continuously articulates said crank lever to build up pressure to a minimum pressure and said user stops articulating said crank lever after a desired amount of infused liquid has exited through said user powered beverage brewing device.

11. The user powered beverage brewing device of claim 10, wherein said minimum pressure is in a range of 6 to 10 bars.

12. The user powered beverage brewing device of claim 10, further comprising:
a flow control device;

wherein said flow control device restricts said infused liquid from exiting said user power beverage brewing device when an internal pressure of said food chamber is below said minimum pressure.

13. The user powered beverage brewing device of claim 10, wherein said two pistons are a first piston and a second piston;

wherein said two cylinders are a first cylinder and a second cylinder;

wherein said rocker arm rotates in an arc such that, when said first piston is pressurizing said liquid in said first cylinder, said second piston is alternately withdrawing from said second cylinder and, when said second piston is pressurizing said liquid in said second cylinder, said first piston is alternately withdrawing from said first cylinder, such that one of said two cylinders are constantly pressurizing said liquid when said rocker arm is rotated by said crank lever.

14. The user powered beverage brewing device of claim 13, wherein said rocker arm is substantially disc shaped and rotates in a continuous 360 degree circle.

15. The user powered beverage brewing device of claim 13, wherein said first piston and said second piston are rotatably connected to opposite sides of said disc shaped rocker arm.

16. The user powered beverage brewing device of claim 13, wherein said food chamber has a food chamber cross-sectional area at a widest point of said food chamber;

wherein each of said two pistons have a cross-sectional area; and wherein a ratio of said cross-sectional area of each of said two pistons to said food chamber cross-sectional area of said food chamber is in a range of ⅕ to ¹⁄₁₀₀, such that a hydraulic mechanical advantage is created, which reduces a force necessary by said user to articulate said lever, which makes it easier for said user to repeatedly and continuously articulate said lever.

17. The user powered beverage brewing device of claim 12, wherein said flow control device is adjustable.

18. The user powered beverage brewing device of claim 7, wherein said lever is indirectly connected to both of said two pistons, such that when said lever is articulated manually, said first piston is pressurizing said liquid in said first cylinder and said second piston is alternately withdrawing from said second cylinder and drawing in said liquid into said second cylinder, and, when said second piston is pressurizing said liquid in said second cylinder, said first piston is alternately withdrawing from said first cylinder and drawing in said liquid into said first cylinder, such that one of said two cylinders are constantly pressurizing said liquid.

* * * * *